Aug. 5, 1969 J. A. ERDLE 3,459,880

FLEXIBLE BUS BAR

Filed Sept. 19, 1967 2 Sheets-Sheet 1

INVENTOR
JACK A. ERDLE

BY [signature]

ATTORNEY

FLEXIBLE BUS BAR

Filed Sept. 19, 1967 2 Sheets-Sheet 2

INVENTOR
JACK A. ERDLE
BY [signature] ATTORNEY 3,459,880
Patented Aug. 5, 1969

3,459,880

FLEXIBLE BUS BAR

Jack A. Erdle, Brighton, N.Y.
(221 Georgian Court Road, Rochester, N.Y. 14610)

Filed Sept. 19, 1967, Ser. No. 668,904
Int. Cl. H01b 7/08, 11/02
U.S. Cl. 174—117 5 Claims

ABSTRACT OF THE DISCLOSURE

This flexible bus bar is used for connecting, for example, circuitry on a cabinet door to circuitry within the cabinet. It is generally S-shaped intermediate its ends, so that it can be stretched, when the door is opened, without changing its capacitance appreciably. The bar comprises alternating superposed, thin layers of copper and dielectric insulating material which are secured to one another at opposite ends only of the bar, and are free to slide relative to one another intermediate these ends. The bar is first formed in flat form, and opposite ends of the flat bar are held while forming dies which have cylindrical arcuate active surfaces are moved toward one another to bend the bar into S-shape.

This invention relates to electrical bus bars, and more particularly to bus bars of the type that are manufactured by laminating thin strips of copper between thin strips of insulation. These bars are usually made up of strips of flexible, ribbon-like copper conductors separated by substantially coextensive strips of insulating material. Confronting faces of the superposed conductors are usually secured to one another by the intervening layer of insulation; and in many such bars, the layers of insulation project beyond opposite sides of the conductors and are secured to one another along the marginal side edges of the bar where they overlap one another. This type of bus bar is capable of being manufactured with exceptionally high capacitance characteristics, but is relatively inflexible. Such laminated bus bars have been used heretofore in the wiring of modular and panel type electronic systems.

In certain types of electronic equipment it is necessary to employ a flexible connector for connecting circuits in a cabinet to other circuits that are mounted, e.g., on the door of the cabinet, so that the door can be opened and closed while maintaining these circuits. It is desirable that the capacitance of this flexible connector remain relatively constant regardless of whether the cabinet door is opened or closed. Heretofore a flexible braid connection has usually been employed between such a cabinet and its door. Such braid, however, has the disadvantage that its capacitance is relatively low.

An object of this invention is to provide an improved connector for cabinets of the type described, which is flexible, but which has high capacitance.

Another object of this invention is to provide an improved, laminated bus bar, which is extremely flexible as compared to prior such bars.

A further object of the invention is to provide a method of producing laminated bus bars of the character described, which will be flexible, have high capacitance, and be simple to produce.

Other objects of the invention will be apparent hereinafter from the specification and from the recital of the appended claims, particularly when read in conjunction with the accompanying drawings.

Figures 1, 2:
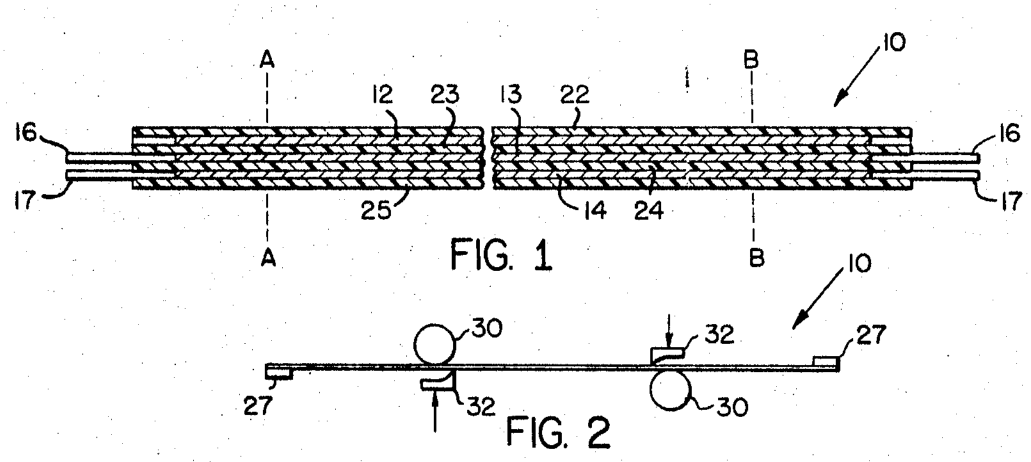
FIG. 1 is an enlarged longitudinal sectional view of a flat bar from which the flexible bar of this invention may be formed.
FIGS. 2, 3 and 4 are views illustrating schematically steps in manufacturing a bus bar according to one embodiment of this invention.

Referring now to the drawings by numerals of reference, and first to FIGS. 5 to 7, 10 denotes a flexible, laminated bus bar of S-shape comprising three, elongate, copper conductor strips 12, 13 and 14, which are disposed in substantially superposed, registering relation. Each strip 12, 13 and 14 has a pair of integral terminals or lugs 15, 16 and 17, respectively, which project from opposite ends of the strip. The two terminals on each strip are aligned longitudinally with one another, but are laterally spaced from the terminals of the other strips at each end of the bar. Strips 12, 13 and 14 are secured in superposed, insulated relation to one another by four interleaved layers or strips 22, 23, 24 and 25 of plastic insulating material such as, for example, the type sold under the trade name "Amron." These layers of insulation project slightly beyond the longitudinal side edges of the superposed conductor strips 12, 13 and 14, but terminate short of opposite ends of the conductor strips so that the terminals 15, 16 and 17 extend beyond the insulation at each end of the bar 10.

The conductor strips 12, 13 and 14 are secured relative to one another only adjacent opposite ends, respectively, of the bar. For example, in the area illustrated in FIGS. 1 and 7 to the left of the line AA, the interleaved conductors and insulation are secured together, while these same conductors and insulation strips are secured together again only to the right of the line BB. Between the lines AA and BB, however, the conductor strips are movable relative to one another. The layers of insulation 22 and 23, for example, are secured along their whole lengths to opposite faces, respectively, of strip 12; the layer of insulation 24 is secured along its whole length to the confronting face of the strip 13; and the insulation 25 is secured along its whole length to the confronting face of the strip 14. Between the lines AA and BB, however, the insulation 23 is not secured to the confronting face of strip 13, and the insulation 24 is not secured to the confronting face of strip 14, so that within the curved portions of the bar, the fully insulated strip 12 and the partially insulated strips 13 and 14 are slidable relative to one another when the bar is flexed, as for example, by stretching it longitudinally to extended position as illustrated by broken lines at 10' in FIG. 6.

The bends at 28 and 29 (FIG. 7) serve thus to compensate for one another. The outer strip 12 at bend 28 has to stretch further than the middle strip 13 and the inside strip 14 at this same bend, because outer strip 12 has to extend around a curve of larger diameter. On the other hand, the inside strip 14 extends at bend 28 around a smaller arc than either of strips 12 or 13. However at bend 29, the reverse is true. The strip 14 has to stretch around the largest diameter arc, and the strip 12 only around the smallest. In this way the bends 28 and 29 compensate for one another, with the result that the bus bar can be made with a high capacitance, which remains substantially constant when the S-shaped bar is flexed.

Figure 3:
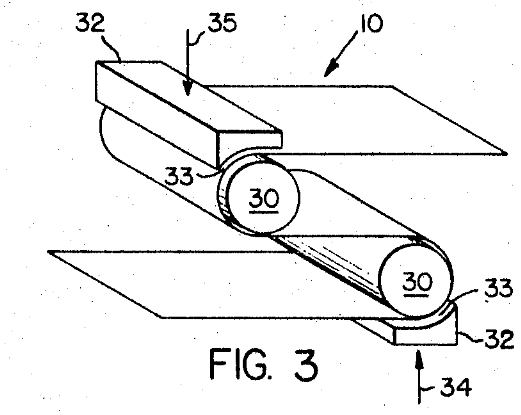
Figure 4:
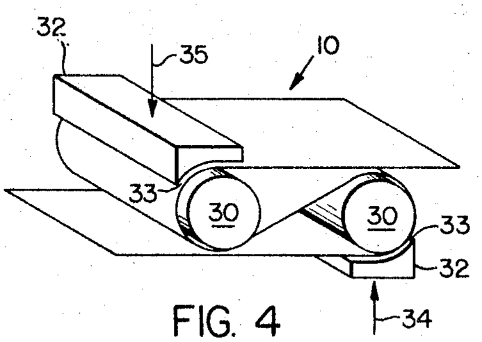
Figure 5:
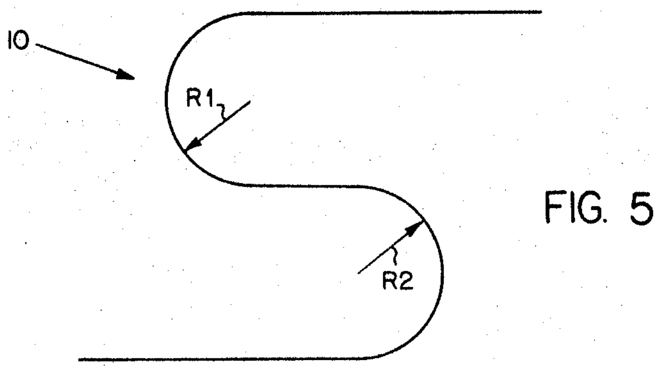
FIG. 5 is a side view of a flexible, laminated bus bar made according to one embodiment of the invention.
Figure 6:
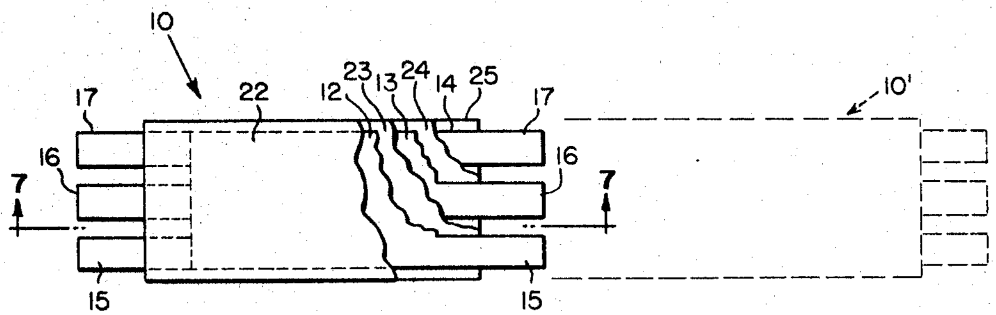
FIG. 6 is a plan view showing in full this bar and illustrating in dash lines the flat bar from which it is made.
Figure 7:
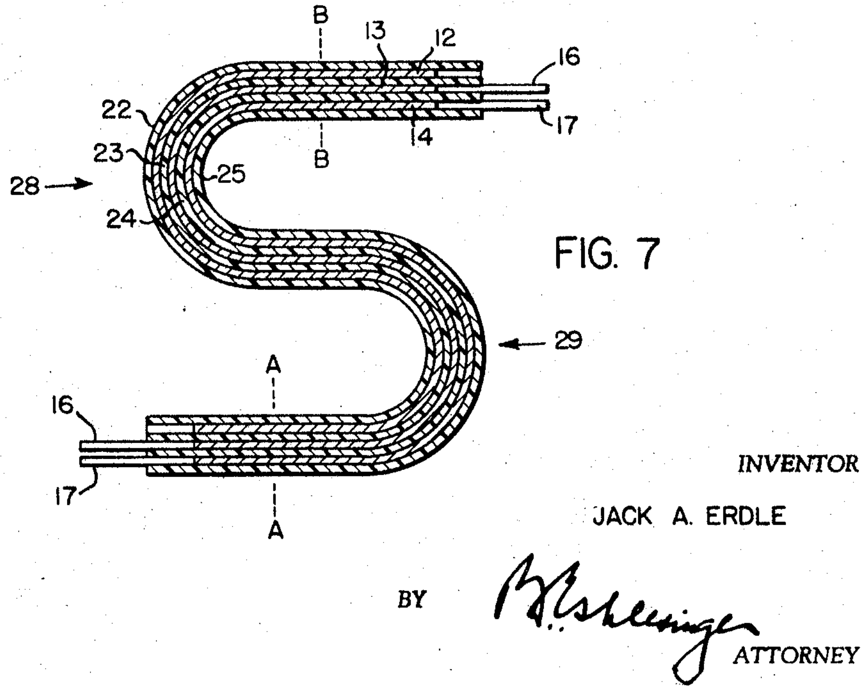
FIG. 7 is a sectional view taken along the line 7—7 in FIG. 6 looking in the direction of the arrows, but showing the thickness of each of the laminations of the bar greatly enlarged, as in FIG. 1, for purposes of illustration.

One manner in which the bar 10 can be formed into its S-shaped configuration is to assemble or stack the conductors 12, 13 and 14, and the layers of insulation 22, 23, 24 and 25 in superposed alternating relation, and secure them together only adjacent opposite ends, as shown in FIG. 1. The laminated bar 10 is then held at its opposite ends by slidably mounted calmps 27; and cylindrical rollers 30 are disposed in spaced relation to one another at opposite sides of the bar as shown in FIG. 2. Opposite each roller there is disposed a forming bar 32, having a cylindrical arcuate forming surface 33. The spacing of the rollers 30 and of their cooperating forming bars 32 is determined by the desired location of the bends 28 and 29. The rolls 30 and bars 32 are then moved in opposite directions, as indicated by arrows 34 and 35 (FIGS. 3 and 4) to form the opposed bends in the bar. The rolls 30 are moved far enough initially to overform the bends (FIG. 4) so that upon release of the bar, it will retain its S-shape. Moreover, the diameters of the rolls 30 must be identical so that the radii R1 and R2 in the finished bar will be equal. This is essential to maintain the capacity of the bar and its several conductors at a substantially constant value. If the bar had only one bend in its length, its capacity would differ considerably for its bent and unbent conditions, respectively; but with a pair of opposed bends intermediate its ends, one bend of a conductor compensates for the other when the bar is stretched, so that its capacity remains relatively constant. The overforming of the bar causes the bent bar to retain memory and return these free portions of the several conductor sheets into close proximity for the desired high capacitance. This process also insures that when the bar is stretched and subsequently released, the bar will tend to return to the S-shaped configuration shown in FIG. 7. Moreover, with the equal radii of curvature R1 and R2 in its opposed bends, as the bar is extended, the two bends begin to open simultaneously, therefore preventing the unsecured, confronting sections of the strips 23, 13 and 24, 14 from separating from one another and forming an undesirable air gap therebetween.

From the foregoing it will be apparent that the instant invention constitutes a considerable improvement over the braid type connection heretofore employed for cabinets of the type described. By forming the bar 10 into opposed curves, and allowing portions of the conductors 12, 13 and 14 intermediate the bar to slide relative to one another, the flexibility of the bar is considerably increased as compared to prior laminated bus bars. Moreover, by properly maintaining the relationship between the radii of curvature of the opposed bends in the bar 10, the capacitance of the bar is maintained relatively constant when the bar is flexed.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A flexible, laminated bus bar, comprising a plurality of elongate, flexible, superposed electrical conductor strips, each of which has intermediate its ends a curved portion registering with a correspondingly curved portion on each of the other of said strips, and layers of flexible dielectric material alternating with said strips to insulate said strips electrically from one another, said strips and ayers being secured together adjacent the ends only of said bar, and said registering curved portions of said strips being free of one another between said ends so that said portions may move relative to one another when said bar is flexed.

2. A flexible, laminated bus bar as defined in claim 1, wherein said bar has an undulant configuration.

3. A flexible, laminated bus bar as defined in claim 2, wherein said bar is S-shaped longitudinall yand has intermediate its ends opposed bends having equal radii of curvature.

4. A flexible, laminated bus bar, comprising a plurality of alternating flat, flexible, undulant strips of electrically conductive material and layers of dielectric material interposed between and electrically insulating said strips from one another, said strips and said layers being secured together adjacent opposite ends thereof, and each of said layers being secured along its entire length to one only of the two strips between which it is interposed.

5. A flexible, laminated bus bar as defined in claim 4, wherein each of said strips is generally S-shaped in configuration and has intermediate its ends opposed, arcuate bends, and said strips are movable relative to one another in the area of said bends, when said bar is flexed.

References Cited

UNITED STATES PATENTS

| | | | |
|---|---|---|---|
| 280,518 | 7/1883 | Rogers. | |
| 2,865,979 | 12/1958 | Klassen | 174—117 X |
| 3,127,469 | 3/1964 | Rather | 174—117 X |

E. A. GOLDBERG, Primary Examiner

U.S. Cl. X.R.

174—69, 129